Patented Sept. 20, 1932

1,878,525

UNITED STATES PATENT OFFICE

BENJAMIN B. KAPLAN, OF MORGANTOWN, WEST VIRGINIA, ASSIGNOR OF ONE-HALF TO DAVID B. REGER, OF MORGANTOWN, WEST VIRGINIA

PROCESS OF PURIFYING WATER

No Drawing.   Application filed February 27, 1929.   Serial No. 343,244.

This invention relates to a process for the removal of corrosive chemicals from mine waters with the recovery of marketable by-products and more specifically, the invention relates to a purification of polluted water, natural or applied, which passes through coal mines, operating or abandoned as well as other mines, such as pyrites, where water passing therethrough would acquire the characteristics of acid mine waters.

All coal mines where seepage water is found must have an outlet for conveying the water pumped to the surface. The only disposal commercially possible at this time, is to empty the water on the surface of the earth, whereupon it finds its way to the small streams and rivers, with the resulting pollution of the streams and thereby causing death of all animal life and a considerable hardening of the water. The effect has been noted particularly in the coal fields of Pennsylvania and West Virginia wherein the municipal water supplies have been polluted, endangering the public health with the result that the cost of removing pollution has been a source of annoyance to the taxpayers.

An analysis of the water reveals that the main constituents of mine water are ferrous sulphate, ferric sulphate, and free sulphuric acid. The ferrous sulphate is gradually converted to ferric sulphate and the latter on dilution with the stream water hydrolyzes to ferric oxide and sulphuric acid and it is this free sulphuric acid which causes most of the corrosion and waste. In a report of the investigation of the Bureau of Mines, January, 1926, by R. D. Leitch it is pointed out that 9,000,000 tons of sulphuric acid is being dumped into the rivers of Pennsylvania alone, and that the attempts made to prevent the water from entering into the streams are few and at best ineffective.

Most of the processes used today depend on neutralization of the acidity with limestone, but this method is very expensive, results in a very hard water and renders recovery of the chemicals impracticable.

With the foregoing in mind, the primary object of the invention is to provide, in a manner as hereinafter set forth, for purifying the polluted water, referred to above, while at the same time producing by-products which will not only cover the cost of purification but will be profitable as a business and thereby promoting the public health with a resulting reduction of municipal, State and Federal taxation.

Further objects of the invention are to provide a process of the character referred to, which is speedy in its operation, requiring the minimum of equipment, highly efficient for its intended purpose and thoroughly reliable in its operation, which is alterable to the demands of the market, requiring the minimum of laboratory control, and comparatively inexpensive to operate.

Another object of the invention is to provide in a manner as hereinafter set forth for treating waste liquors containing cyanides and sulpho-cyanides with polluted mine waters to produce a reagent vitally necessary in the purification of the mine waters.

With the foregoing and other objects in view, the invention consists of a novel and useful process, as will hereinafter be more specifically described and illustrated, wherein is disclosed an embodiment of the invention, but it is to be understood that changes, variations and modifications may be resorted to without departing from the spirit or scope of the claims hereunto appended.

The process is particularly adapted to the production of Prussian blue, hereinafter designated as Monongahela blue, for the reason that the demands of the present market together with the fact that the process is more easily carried out in the production of Monongahela blue will justify this operation; but it is pointed out that the process contemplates the alterations in ways hereinafter to be described, should the market become flooded with Monongahela blue.

The following embodiment is devoted to the invention as applicable to the production of Prussian blue and fertilizers, or the production of Monongahela blue with a purified water turned into the streams resulting from the Monongahela blue.

The mine water from coal mines is usually conducted to the surface of the earth in large pipes which are connected directly to large metallic reservoirs or treating tanks of the present invention. The mine water has had very little opportunity to hydrolize at this point and has very little sulphuric acid therein. The hydrolization is promoted by dilution when it reaches the stream.

The mine water is agitated in the reservoir by any suitable means and sampled and analyzed. The sample may be reduced with stannous chloride and titrated with a standard solution of potassium chromate to determine the amount of potassium ferrocyanide to be added to the mine water.

Having determined the proper theoretical amount, then 98% of the theoretical amount of potassium ferrocyanide is added to the mine water. The potassium ferrocyanide is added in the form of a solution and in a slow stream while the mine water in the tank is being agitated. It is a distinct improvement in the process and an important feature thereof to add 98% of the theoretical amount of potassium ferrocyanide because after long search and investigation it has been found that this factor makes the process economically possible by speeding up the reaction and precipitation of the Monongahela blue.

If the theoretical amount of potassium ferrocyanide be added the precipitate will not come down quickly and will be in a finer state of division, whereas if a lesser amount than 98% be used the purpose of the process will be lost. While I have designated the use of potassium ferrocyanide as the precipitating reagent, it would be possible to use sodium or ammonium calcium, or barium ferrocyanides or corresponding cyanides.

It has been found that the process operates better and quicker under conditions of increased temperature, but the process operates under better economical conditions at atmospheric temperatures. Upon the addition of the cyanides the Monongahela blue precipitates out of the solution and settles to the bottom of the reservoir or tank and is washed by decantation. It is pointed out that I do not restrict myself to the use of potassium, sodium, calcium, barium or ammonium ferrocyanides or cyanides thereof as any other cyanides which are added would directly or indirectly finally produce the blue pigment and it is therefore to be included in the scope of this process.

Barium ferrocyanide may be substituted for potassium ferrocyanide with advantage. As far as I know this use of the barium salt is new and is particularly applicable to the treatment of mine waters. The reactions and method of procedure are identical with those described for potassium ferrocyanide with the exception that barium sulphate is formed instead of potassium sulfate.

Since barium sulphate is insoluble in acids as well as alkali the use of this reagent removes in one and the same time the iron as well as the sulphates from the mine water. And whereas, in the case of potassium ferrocyanide the potassium sulphate remains in solution, in this process the added chemicals merely combine with those in the mine water to yield Monongahela blue mixed with barium sulphate and a water purified from all iron sulphates as well as sulphuric acid.

The disadvantage is of course in the fact that the Monongahela blue is adulterated with baryta. Now in many instances barytes and Monongahela blue are mixed in paints, and the product may be partially marketable in that mixed form. The separation of the blue pigment and the barytes is feasible and its practice is largely a question of economics.

An additional advantage in using barium is that the resulting pigment settles in a few minutes whereas in the usual practice of the manufacture of Prussian blue from 1–10 days is required for the settling. This quality is not to be underestimated inasmuch as it will make it possible to handle more water more rapidly with less equipment and less plant space.

The reaction in using barium ferrocyanide is as follows:

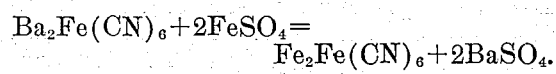

$$Ba_2Fe(CN)_6 + 2FeSO_4 = Fe_2Fe(CN)_6 + 2BaSO_4.$$

In the practical application of the process I use potassium ferrocyanide because it produces the best quality of resulting pigment. In using the potassium ferrocyanide with the acid mine water the following reaction occurs:

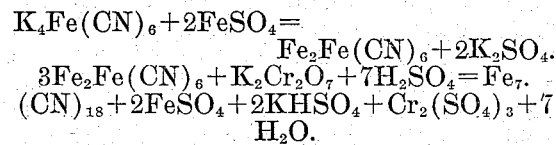

$$K_4Fe(CN)_6 + 2FeSO_4 = Fe_2Fe(CN)_6 + 2K_2SO_4.$$
$$3Fe_2Fe(CN)_6 + K_2Cr_2O_7 + 7H_2SO_4 = Fe_7(CN)_{18} + 2FeSO_4 + 2KHSO_4 + Cr_2(SO_4)_3 + 7H_2O.$$

The above precipitate of Monongahela blue is insoluble in acid water and when the process is properly conducted settles to the bottom of the container in a reasonable time making the process commercially possible. The mother liquor is neutral to litmus and upon evaporation will yield a pure white solid consisting of approximately fifteen per cent of potassium sulphate.

The filtrate from the above process, if found to be commercially profitable, is next run into evaporating tanks where crystalization results with the recovery of a salt which is largely potassium sulphate with small percentages of calcium and magnesium sulphate. It is well known that potassium sulphate is used for a fertilizer and that the price is about fifty dollars per ton.

If the filtrate is too dilute to make evaporation and recovery of the salt feasible, which is the ordinary case, then it can be run into streams without effecting pollution, since the iron has been removed and the sulphuric acid has been neutralized to form potassium sulphate.

Now in the case of the barium ferrocyanide process, where the corrosive chemicals have been removed from the water, the water is run into the streams.

It is a well known fact that potassium sulfate has no effect on hardening water and is not injurious to the public health, so that by permitting the mother liquor to enter the stream no deleterious effect will result therefrom, either upon the public health or the animal life of the stream.

In view of the foregoing process it is pointed out that a public nuisance has been utilized and converted in its entirety or rendered harmless by adapting it to the production of a product the market demand for which will result in a novel consumption of the nuisance. The novelty consists in using mine water as a bath for producing Prussian blue instead of commercial ferrous sulfate obtained either directly from scrap iron and sulphuric acid, or as a by-product in galvanizing plants. No free acid need be added in the operation of this invention, since there is sufficient acid in the water to hold the ferric salt in solution. Oxidation to the ferric condition is well under way when the mine water reaches the surface of the ground and continues during the agitation, whereupon outside oxidizing reagents may be omitted without damage to the resulting pigment of Monongahela blue.

In carrying out the process in accordance with this invention, we remove from our streams a public nuisance and recover a marketable pigment and fertilizer. The process may be modified, if it is considered unwise to convert all of the iron salts to Monongahela blue. In this aspect of the invention the mine water in the treating tank is oxidized. An insufficient amount of potassium ferrocyanide to precipitate all of the iron salts is then added to the container. When the precipitate is formed the mass is heated to 212 degrees F. whereupon the ferric salts remaining in solution will be hydrolized precipitating out iron oxide. The iron oxide will then mix with the previously precipitated Prussian blue and after thorough agitation will form a stable, uniform green pigment, the shade of which will be controlled by the amount of potassium ferrocyanide added and the amount of iron in solution. Should it be desired to recover the red pigment of iron oxide the mother liquor resulting from the Prussian blue precipitation may be drawn off and boiled whereupon the iron oxide may be precipitated alone.

This foregoing step in the process may be reversed without departing from the spirit of the invention; that is to say, the mine water is heated to boiling temperature and the iron therefrom is precipitated; whereupon the filtrate is treated with prussiate of a suitable metal to precipitate out the blue pigment.

Another modification of the process arises from the utilization waste liquors containing cyanides and sulpho-cyanides for obtaining potassium ferrocyanide to be used as an active reagent in the production of the Prussian blue of the present invention. Inasmuch as waste liquors cause as much nuisance by pollution of streams as the mine water it is pointed out that the following modification will rid the community of two public nuisances at one and the same time.

A source of waste liquors containing cyanides and sulphocyanides is found in coking plants and as a rule the coking plants are found within easy reach of the coal field. It would therefore be economically sound to bring the two together to produce a useful product in the following manner, while at the same time consume what would otherwise by a public nuisance.

Waste liquors containing cyanides or sulphycyanides may be placed in a large container and acidified with the partially hydrolized mine water which is strongly acid. Air should be bubbled through the mixture, collected and passed through an alkali such as potassium hydroxide with the resultant formation of potassium cyanide in solution which is the essential ingredient to the production of the Monongahela blue of the original process.

Having thus described my invention, what I claim as new is:

1. The process of purifying mine water comprising adding a cyanide to the mine water and separating the resulting precipitate from the mother liquor.

2. The process of purifying mine water comprising adding a cyanide of an alkaline earth metal to the mine water and separating the resulting precipitate from the mother liquor.

3. The process of purifying mine water comprising adding an iron cyanide to the mine water and separating the resulting precipitate from the mother liquor.

4. The process of purifying mine water comprising adding potassium ferrocyanide to the mine water and separating the resulting precipitate from the mother liquor.

5. The process of purifying mine water comprising adding a ferrocyanide of an alkaline earth metal to the mine water and separating the resulting precipitate from the mother liquor.

6. A process of purifying mine water in which an iron oxide pigment results, comprising adding a ferrocyanide to the mine water to cause rapid precipitation of a pigment oxide sludge, and returning the water to a stream.

7. A process of purifying mine water, in which an iron oxide pigment results, consisting of deriving pigment oxide from the mine water by adding a cyanide of an alkaline earth metal to cause rapid precipitation of oxide sludge, and returning the mother liquor to a stream.

8. A process of purifying mine water, in which an iron oxide pigment results, comprising adding a ferrocyanide to the mine water to cause precipitation of an oxide sludge and discharging the mother liquor resulting from the precipitation into a stream.

9. A process of purifying mine water, in which results a precipitation of an iron oxide sludge pigment, consisting in adding a predetermined amount of ferrocyanide of an alkaline earth metal to the mine water to cause rapid precipitation of the oxide sludge and discharging the mother liquor resulting from the precipitation into a stream.

In testimony whereof I affix my signature.

BENJAMIN B. KAPLAN.